US010602289B2

(12) United States Patent
DiFoggio et al.

(10) Patent No.: US 10,602,289 B2
(45) Date of Patent: Mar. 24, 2020

(54) ACOUSTIC TRANSDUCER WITH A LIQUID-FILLED POROUS MEDIUM BACKING AND METHODS OF MAKING AND USING SAME

(75) Inventors: Rocco DiFoggio, Houston, TX (US); Roger R. Steinsiek, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 665 days.

(21) Appl. No.: 13/039,895

(22) Filed: Mar. 3, 2011

(65) Prior Publication Data

US 2011/0222369 A1    Sep. 15, 2011

Related U.S. Application Data

(60) Provisional application No. 61/311,888, filed on Mar. 9, 2010.

(51) Int. Cl.
*H04R 31/00* (2006.01)
*H04R 17/00* (2006.01)
*G01V 1/52* (2006.01)
*H04R 17/02* (2006.01)

(52) U.S. Cl.
CPC ............ *H04R 31/00* (2013.01); *G01V 1/523* (2013.01); *H04R 17/00* (2013.01); *H04R 17/02* (2013.01); *Y10T 29/49005* (2015.01)

(58) Field of Classification Search
USPC ...... 367/162, 166, 176; 428/539.5; 181/207, 181/208
See application file for complete search history.

(56) References Cited

U.S. PATENT DOCUMENTS

| | | | | |
|---|---|---|---|---|
| 4,381,470 A | * | 4/1983 | Leach | G10K 11/165 310/327 |
| 4,439,497 A | * | 3/1984 | DiFoggio | G10K 11/002 181/207 |
| 4,528,652 A | | 7/1985 | Homer et al. | |
| 4,616,152 A | | 10/1986 | Saito et al. | |
| 4,759,000 A | | 7/1988 | Reitz | |
| 4,779,224 A | | 10/1988 | Homer et al. | |
| 4,779,244 A | * | 10/1988 | Horner | B06B 1/0685 181/151 |
| 4,996,675 A | * | 2/1991 | Beauducel | B06B 1/0685 367/162 |
| 5,138,588 A | | 8/1992 | Chuan et al. | |
| 5,267,221 A | * | 11/1993 | Miller | G10K 11/002 310/327 |
| 5,418,759 A | | 5/1995 | Fiebiger et al. | |
| 5,841,734 A | * | 11/1998 | Ritter | E21B 47/0005 367/35 |
| 6,302,847 B1 | | 10/2001 | Glenn et al. | |

(Continued)

OTHER PUBLICATIONS

Biot, M.A., "Generalized Theory of Acoustic Propagation in Porous Dissipative Media*:" The Journal of the Acoustical Society of America, vol. 34, No. 9, Sep. 1962, pp. 1254-1264.

(Continued)

*Primary Examiner* — Krystine E Breier
(74) *Attorney, Agent, or Firm* — Cantor Colburn LLP

(57) ABSTRACT

In one aspect, the disclosure provides an apparatus that includes an acoustic transducer, and a backing coupled to the transducer, wherein the backing includes solid grains with fluid between the grains.

17 Claims, 3 Drawing Sheets

(56) References Cited

U.S. PATENT DOCUMENTS

| | | | |
|---|---|---|---|
| 6,354,146 B1 | 3/2002 | Birchak et al. | |
| 6,514,618 B1* | 2/2003 | McKeighen | B32B 7/02 367/162 |
| 7,587,936 B2* | 9/2009 | Han | E21B 47/01 367/25 |
| 7,750,536 B2* | 7/2010 | Chaggares | B06B 1/067 310/334 |
| 8,207,652 B2* | 6/2012 | Baumgartner | G10K 11/002 310/334 |
| 2005/0000279 A1 | 1/2005 | Yogeswaren | |
| 2009/0213690 A1 | 8/2009 | Steinsiek et al. | |

OTHER PUBLICATIONS

Biot, M.A., "Theory of Propagation of Elastic Waves in a Fluid-Saturated Porous Solid, I. Low-Frequency Range," The Journal of the Acoustical Society of America, vol. 28, No. 2, Mar. 1956, pp. 168-178.

Gardner, G.H.F., et al., "Effects of Pressure and Fluid Saturation on the Attenuation of Elastic Waves in Sands," SPE 721, Journal of Petroleum Technology, Petroleum Transaction, Feb. 1964, pp. 189-198.

Grewe, M.T. et al., "Acoustic Properties of Particle/Polymer Composites for Ultrasonic Transducer Backing Applications," IEEE Transactions on Ultrasonics, Ferroelectrics, and Frequent Control, vol. 37, No. 6, Nov. 1990, pp. 506-675.

Nguyen, N.T. et al., "Highly attenuative rubber modified epoxy for ultrasonic transducer backing application," Ultrasonics 34, (1996), pp. 669-675.

Peselnick, L. et al., "Internal Friction in Shear and Shear Modulus of Solenhofen Limestone over a Frequency Range of 10 7 Cycles per Second," Journal of Geophysical Research, vol. 66, No. 2, Feb. 1961, pp. 581-588.

* cited by examiner

ACOUSTIC TRANSDUCER WITH A LIQUID-FILLED POROUS MEDIUM BACKING AND METHODS OF MAKING AND USING SAME

CROSS-REFERENCE TO RELATED APPLICATION

This application takes priority from U.S. Provisional Application Ser. No. 61/311,888, filed Mar. 9, 2010, which is hereby incorporated in its entirety herein by reference.

BACKGROUND INFORMATION

1. Field of the Disclosure

This disclosure relates acoustic sensors having high acoustic attenuation backings, methods of making such sensors and using same in acoustic tools for downhole well logging and other applications.

2. Description of Prior Art

Typical downhole acoustic logging tools utilize one or more acoustic transmitters and a number of acoustic receivers. The frequency of a typical transmitter is in the ultrasonic range, generally 100 kHz or more. Such higher acoustic frequencies are preferred in order to achieve better resolution in the confined space of a borehole. The tool is generally enclosed by a fluid in the wellbore. The transmitters often utilize piezoelectric transmitters in a ceramic or metallic enclosure. Transmitters transmit acoustic signals into the earth formation surrounding the borehole and the various receivers sense acoustic signals reflected by the formation. Such received signals are processed to determine a property of interest of the formation and/or of the borehole wall.

The active part of a typical ultrasonic transducer has a low ultrasonic absorption that causes it to ring when the transducer is excited. Such transducers typically contain a piezoelectric active element. A backing material is usually attached to the transducer backside to scatter and/or absorb acoustic energy to reduce ringing, and to attenuate acoustic signals to reduce unwanted reflections and reverberations in the backing. Acoustic attenuation and impedance (product of density and sound speed) are two important properties of a backing. The acoustic impedance of the backing for piezoelectric ceramic transducer materials generally range from a high value of approximately 30 MRayl to a low value of 2-4 MRayl, depending on the transducer design. Attenuation is the loss of acoustic energy and is mainly due to scattering of acoustic energy and absorption losses. Typically, acoustic transducer backing materials are constructed of a solid matrix, usually an epoxy or another polymer filled with solid fillers such as tungsten powder to increase the density, and tungsten particles or micro balloons, etc., that act as acoustic scatterers, to increase the attenuation. As acoustic waves pass through the backing, any motion of the filler particles relative to the matrix aids to inelastically attenuate the acoustic waves. In the case of a filler that is dense and has higher acoustic impedance than the matrix, the acoustic impedance of the backing material increases with the amount of the added filler. The composition of the backing is chosen to match the acoustic impedance of the backing to that of the transducer.

A porous media submerged in a fluid has been utilized to attenuate acoustic waves traveling in that fluid and to act as a blocking baffle to prevent acoustic waves from propagating in the fluid beyond the baffle. Such a device however has not been used as a direct acoustic transducer backing to absorb acoustic waves generated by a solid material. The disclosure herein provides a liquid-filled porous medium backing and transducers and acoustic tool using the same, which transducers are suitable for high temperature and wellbore applications.

SUMMARY

In one aspect, an acoustic apparatus is provided, that in one embodiment, includes an acoustic transducer and a backing coupled to the transducer configured to attenuate acoustic waves received at the transducer, wherein the backing includes solid grains with a liquid in spaces between the solid grains.

Another embodiment provides a method that in one aspect includes: providing an acoustic transducer; providing a backing that includes solid grains with a liquid in spaces between the solid grains; and coupling the backing to the transducer to attenuate acoustic waves received by the transducer.

Examples of certain features of an apparatus and a method disclosed herein are summarized rather broadly in order that the detailed description thereof that follows may be better understood. There are, of course, additional features of the apparatus and method disclosed hereinafter that will form the subject of the claims appended hereto.

BRIEF DESCRIPTION OF THE DRAWINGS

The present disclosure is best understood with reference to the accompanying figures in which like numerals refer to like elements and in which.

DESCRIPTION OF ILLUSTRATIVE EMBODIMENTS

Figure 1:
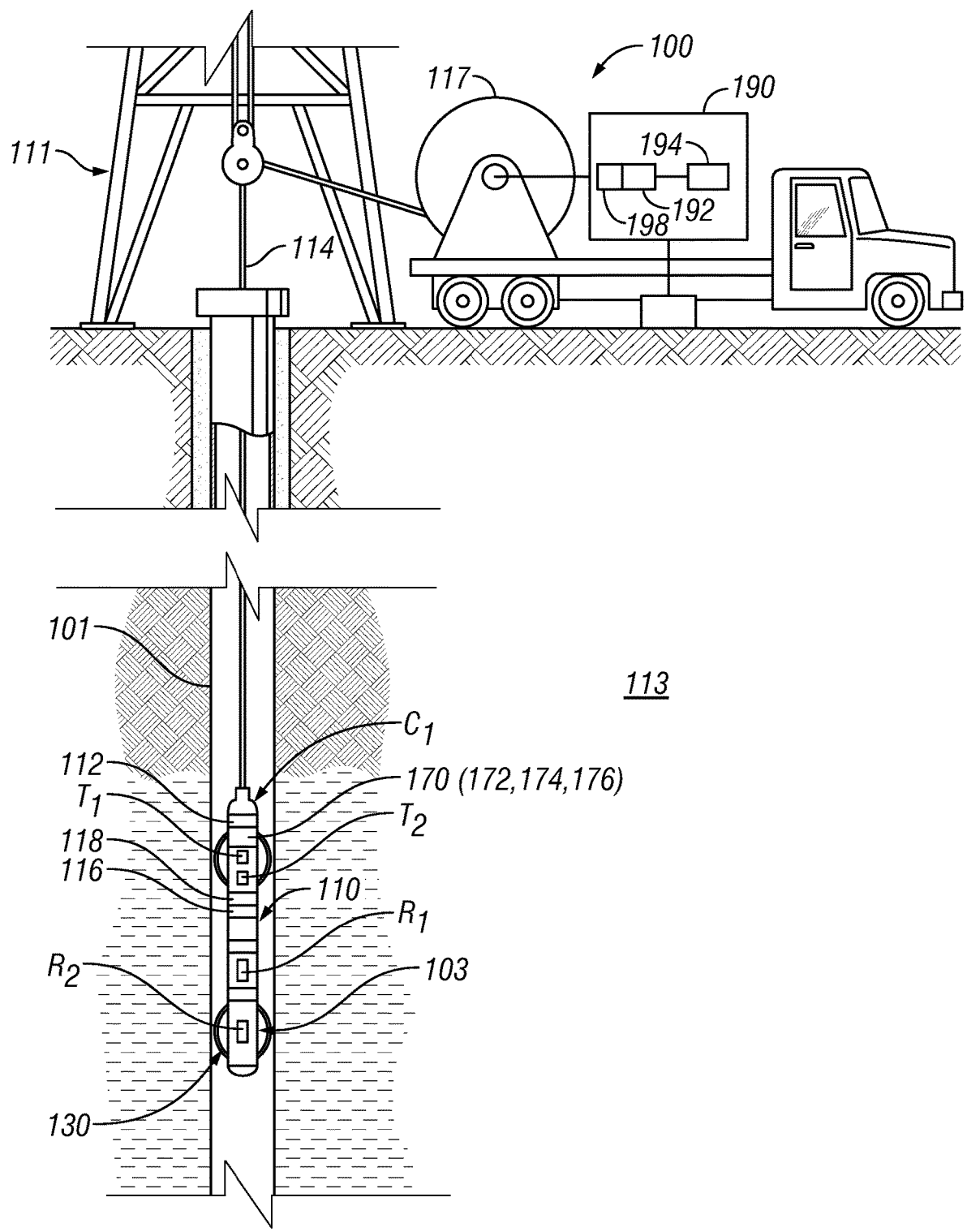
FIG. 1 shows an acoustic well logging tool configured to utilize acoustic transducers described herein.

FIG. 1 shows a schematic illustration of an exemplary well logging system 100. System 100 is shown to include a logging instrument or tool 110 conveyed into a wellbore or borehole 101 formed in an earth formation 113. The tool 110 may be conveyed into the wellbore 101 by any suitable member 114, such as an electrical armored cable (also referred to as "wireline"), a slick line, a coiled-tubing, etc. The conveying member 114 may be spooled on a winch 117 or similar device known in the art. The conveying member 114 may be conveyed into the wellbore 101 using a platform or rig 111 at the surface. The conveying member 114 is electrically connected at one end to a surface control unit 190 and at the other end to the tool 110. The control unit 190 may be a computer-based system configured to process data or signals provided by the tool 110 to estimate one or more parameters of interest and send command signals to various components of the tool 110 and generally control the operation of the tool 110. The control unit 190 includes a processor 192, a data storage device 194 and programs to process data and control the operations of the tool 110. The control unit 190 may also include a display unit and peripherals to enter data and to provide a human interfaced. A telemetry system 112 may be used to establish bi-directional data communication between the tool 110 and the control unit 190. The control unit 190 and the tool 110 also may respectively include signal decoding and interpretation units 198 and 116 and storage or recording units 194 and 118. The tool 110 also may include a control unit 170, which may further include a processor 172 (such as microprocessor), data storage device 174, such a solid-state memory, and computer programs 176 configured to be used by the processor 172 for executing instructions contained in such programs 176. The signals transmitted by the tool 110 to the surface control unit 190 and the signals transmitted by the control unit 190 to the tool 110 are decoded, interpreted, recorded and processed by the respective control units.

Still referring to FIG. 1, the tool 110 is further shown to include exemplary transmitters T1 and T2 made according to one embodiment of the disclosure, as described in more detail in reference to FIGS. 2-5. A transmitter circuit causes the transmitters T1 and T2 to transmit acoustic signals into the earth formation 113. Receivers R1 and R2 receive acoustic signals reflected by the earth formation 113 in response to the transmitted signals. A suitable electrical circuit C1 conditions the received signals and the control unit 170 processes such conditioned signals. The tool 110 shown in FIG. 1 illustrates an exemplary wireline tool that provides information for determining or estimating a parameter of interest or property of the formation 113, such as acoustic porosity, bed boundary location, etc. In another aspect or configuration, the tool 110 may utilize transducers on a member 130, which transducers are placed proximate to or in contact with the borehole wall 103 for imaging the borehole wall 103. For the purpose of this disclosure, any acoustic tool that utilizes a transducer made according to an embodiment described herein may be utilized for estimating or determining a property of interest. Additionally, it should be noted that although FIG. 1 shows a wireline acoustic tool, the tool 110 may be a measurement-while-drilling acoustic tool (also referred to a logging-while-drilling tool) for estimating a parameter or property of interest during drilling of a wellbore. For drilling applications, the tool may be a part of a drilling assembly that is conveyed by a jointed-tubular or a coiled-tubing. The telemetry for such application may include any suitable telemetry method, including, but not limited to, mud pulse telemetry, electromagnetic telemetry; wireless telemetry; and wired-pipe telemetry.

Figure 2:
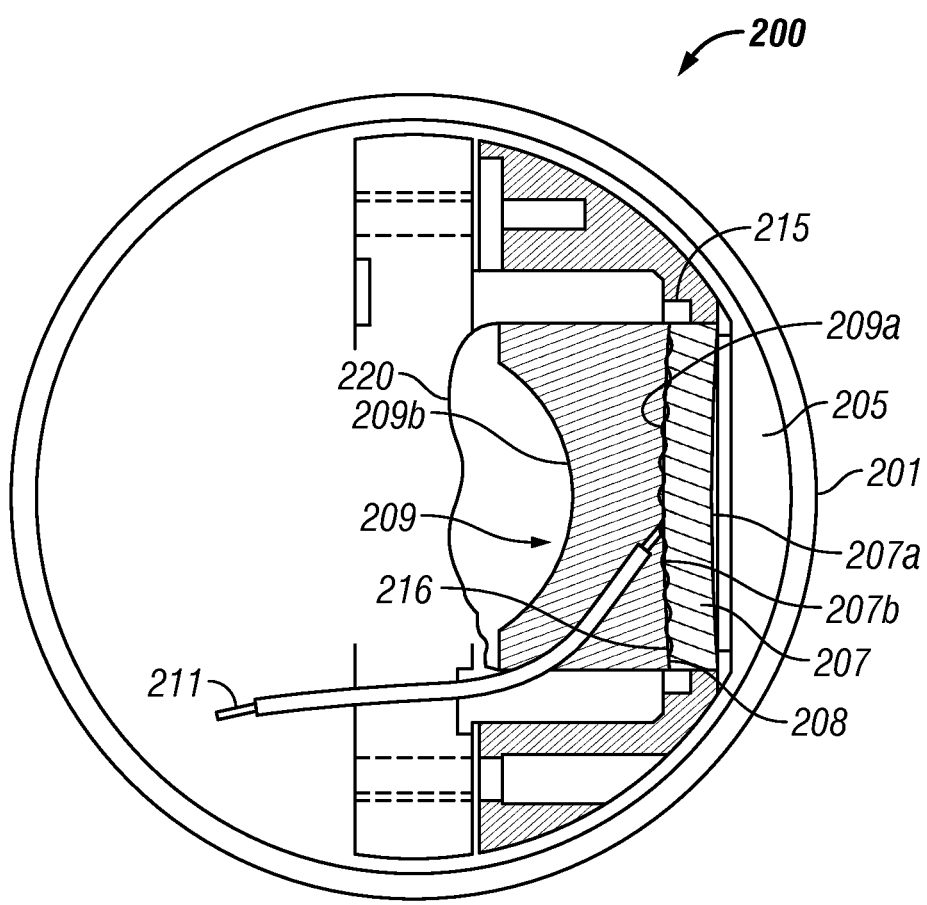
FIG. 2 is a schematic diagram of an exemplary transducer made according to one embodiment of the disclosure.

FIG. 2 shows a cross-section of an exemplary transducer assembly 200 made according to one embodiment of the disclosure. The transducer assembly 200 includes a transducer 207 and a window 201 made from a suitable material, such as material sold under the trade name Teflon®. In one embodiment, the transducer 207 may be a ceramic piezoelectric ultrasonic transducer. The transducer 207 transmits signals from its front side 207a through the window 201 into a formation through the fluid in the wellbore. Alternatively, the transducer 207 may be mounted on a member, such as an extendable arm, that causes the transducer 207 or the transducer assembly 200 to extend proximate to or contact the wellbore wall. In one aspect, the space between the front side 207a of the transducer 207 and the window 201 may be filled with a suitable material 205, such as oil. In one aspect, the acoustic impedance of transducer 207 is matched to the acoustic impedance of the material 205. It should be noted that the use of Teflon® is not to be construed as a limitation and any other material with a desired abrasion resistance and acoustic properties may be utilized for the purpose of this disclosure.

Still referring to FIG. 2, the transducer assembly 200 also includes a backing (or an acoustic attenuator) 209 having a front side 209a and a back side 209b. The back side 209b of the backing 209 is placed in contact with the back side 207b of the transducer 207. The transducer 207 and the backing 209 may be coupled to each other at the interface 208 by any suitable device 215, such as clamps. A suitable epoxy, grease, fluid, soft metal membrane, or adhesive 216 also may be utilized to couple the backing 209 to the transducer 207. In one configuration, epoxies or other adhesives used with a consolidated porous medium backing may be attached only along the circumference of the backing to the circumference of the transducer. Suitable leads 211 may be utilized to couple the transducer 207 to an electrical circuit, such as one using or not using a transformer coil, to energize the transducer 207 to transmit acoustic waves at a selected frequency. In one aspect, the frequency is an ultrasonic frequency. In another aspect, the frequency is more than 100 kHz. The backing 209 is configured to attenuate acoustic signals propagating to the transducer side 207b and to reduce reflections from the interface 208 between the transducer 207 and backing 209. In one aspect, the backing 209 may include a liquid-filled porous medium. The backing acoustic impedance is matched to the impedance of the transducer side 207b. In another aspect, a pressure-compensation device 220 may be provided to compensate for changes in pressure of the fluid in the backing 209. Certain details of the backing and the pressure compensation device are described in more detail in reference to FIGS. 3-5.

Figure 3:
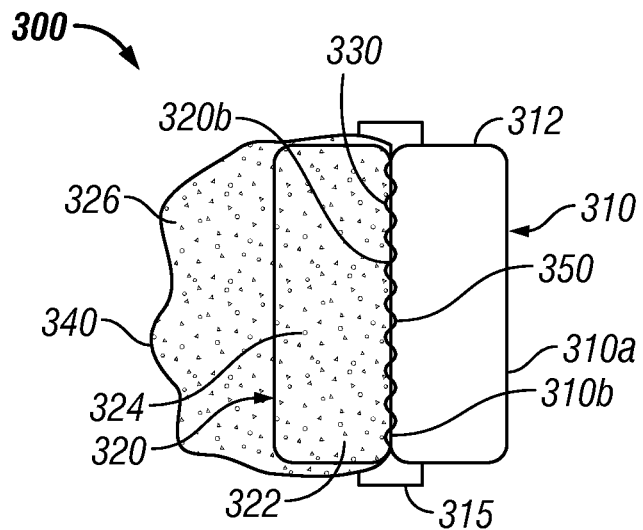
FIG. 3 is a line drawing of a partial transducer assembly showing an acoustic transmitter with a backing and a pressure bellows pressure-compensation device, according to one embodiment of the disclosure.

FIG. 3 shows a line drawing of a partial transducer assembly 300 made according to one embodiment of the disclosure. Assembly 300 is shown to include a transmitter (or transducer) 310 having a front side 310a and a back side 310b. A side 320b of backing 320 is coupled to the back side 310b of the transducer 310 by a suitable coupling 315, which may be mechanical coupling made from a suitable material, such as steel, bronze, an alloy, or a composite material. An adhesive, fluid, grease, soft metal membrane, or epoxy 330 may also be used to couple the backing 320 to the transducer 310. The transducer 310 may include a piezoelectric member in a ceramic or metallic body 312. Other transmitters may also be used for the purpose of this disclosure. In one aspect, the backing 320 may be a liquid-filled porous medium 322. The porous medium 322 may be a made from solid particles (filler), such as bronze particles, steel particles, etc. In one aspect, the filler may be a sintered material. The backing porous medium 322 may be made by compressing a metal powder in a reducing atmosphere at temperature sufficient to cause the powder particles to fuse to one another and thereby becoming a metallic "rock" (porous medium) having a desired porosity or spaces between the grains of the filler material. The spaces between the grains may then be filled with a suitable liquid 324, such as silicone oil. In an aspect, the liquid-filled porous medium backing 320 attenuates the sound waves reaching the transmitter back side 310b. The attenuation increases as the frequency increases. A silicone oil-filled sintered metal filler backing, such as backing 320, exhibits high acoustic attenuation, such as in the range of 50-300 db per inch. For example, a 153 grade sintered porous bronze filled with Dow Corning silicone oil has an acoustic attenuation of 100 db/inch or more at 120 kHz. A grade 153A sintered bronze has grain density of 8.886 gr/cm3, pore diameter of 36-60 microns, porosity of 40.7 percent and permeability of 3.230 millidarcies. A fluorosilicon liquid, such as Dow Corning FS-1265 or another high temperature liquid may also be used for the purpose of this disclosure. For operating temperatures of 300 C, a high temperature liquid, such as high oleic vegetable oil or a natural ester-based liquid, such as a product commercially available under the trade name "Envirotemp FR3," may be used.

Still referring to FIG. 3, the assembly 300 may further include a pressure-compensation device 340. In one aspect, the pressure-compensation device 340 may be a bellows containing a liquid 326. The bellows 340 may be placed around the backing 320 and secured around the transducer with the coupling 315. Any other mechanism may be used to couple the bellows to the backing 320. In operation, liquid from the backing may move away from of the backing due to an increase in pressure and/or temperature in the wellbore. Such liquid is absorbed by the liquid 326 in the bellows 340, which may cause the bellows to expand, thereby providing pressure compensation to the transducer 310.

Figure 4:
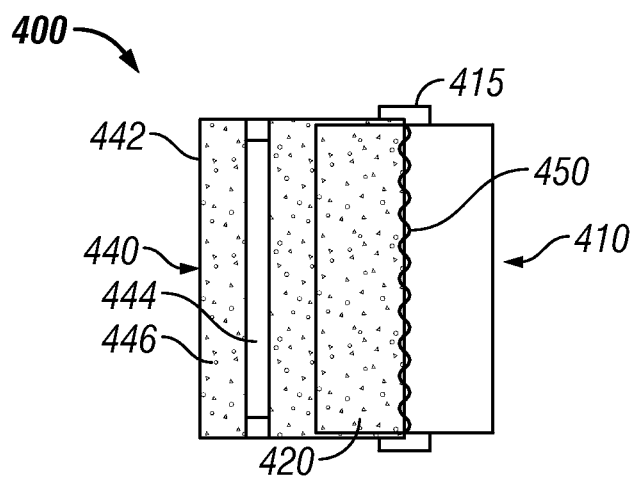
FIG. 4 is a line drawing of a partial transducer assembly with an acoustic sensor, a backing and a piston type pressure-compensation device, according to one embodiment of the disclosure.

FIG. 4 shows another embodiment of a pressure-compensated acoustic transducer assembly 400. Assembly 400 includes a backing 420 coupled to an acoustic transducer 410 in manner described in reference to FIG. 3. In one aspect, a pressure compensation device 440 provides pressure compensation to the transducer 410 to prevent any substantial differential pressure across the transducer from damaging or cracking the transducer when the apparatus is exposed to high downhole pressure. Ceramics used in transducers are strong in compression and thus strong under hydrostatic loading. Ceramics, however, are not strong under tension. Therefore, if a substantial differential pressure is applied across the face of a ceramic transducer held by its rim, cracks may develop in the regions of the transducer that are in tension. Therefore, pressure compensation can be beneficial in downhole and other high pressure applications. In aspects, the pressure compensation device 440 may include a chamber 442 enclosing the backing 420. The chamber 442 may include a floating piston 444. The chamber 442 may include a selected amount of liquid 446 on either side of the piston 444. An increase in the volume of the liquid 446, such as may be generated due to an increase in the pressure and/or temperature of the backing or the transducer, will cause the piston 444 to move away from the backing 420, thereby providing pressure compensation to the transducer 410. A decrease in volume of the liquid 446 in the backing will cause the piston 444 to move toward the backing 420.

Figure 5:
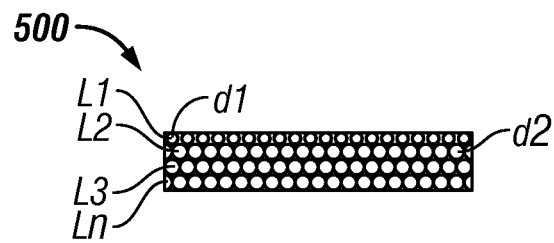
FIG. 5 shows the backing made using layers of solid grains of different sizes made according to one embodiment of the disclosure.

FIG. 5 shows a solid porous medium 500 made according to another embodiment of the disclosure for use as a backing, as discussed above. The solid porous medium 500 includes a plurality of layers L1-Ln. In one aspect, different layers may be made from grains of a metal of different sizes. For example, layer L1 may have grains of size d1 while layer L2 may have grains of size d2. Grains in other layers L3-Ln may be of the same size as those of layers L1 and L2 or may include grains of different sizes. In general, the solid porous medium 500 includes at least two layers having grains of different size. The grain sizes and the associated layers may be chosen such that the solid porous medium 500 provides optimal attenuation of the acoustic signals generated by the transducer to which it is matched. Such fluid-filled granular systems are very highly absorbing of acoustic signals. The layers may be designed to address the issue that there is always some reflection at an interface between layers that have different absorption coefficients. By placing the least acoustically absorbing layer (largest pore size with lowest viscosity filling fluid) next to the transducer and then placing the more attenuating layers thereafter, it is possible to avoid any interface that has too sharp a transition in the absorption coefficient, thereby avoiding any significant acoustic reflection due to a sudden change in absorption. An equation for the acoustic amplitude reflection coefficient at an interface at which there is a transition in absorption may be expressed as:

$$R_{lossy} = R_{lossless} + i\Delta/2,$$

where, $R_{lossless}$ is the lossless acoustic reflection coefficient and $\Delta$ is the change in $\alpha/k$ (absorption coefficient per wavenumber) across the interface.

In aspects, the fluid-filled porous media used as transducer backing material made according to present disclosure may exhibit two desired properties: (1) very high or maximum acoustic absorption; and (2) very low or minimum acoustic reflections at the interface between the backing material and the transducer. Specifically, the acoustic impedance of the fluid-filled porous media may be closely matched with the acoustic impedance of the transducer with which it is in contact to minimize acoustic reflections. In addition, because the fluid in the fluid-filled porous media is in contact with the face of the transducer, this design provides a natural means for pressure compensation of the transducer.

Thus, in one aspect, the disclosure provides an apparatus that includes an acoustic transducer, a backing coupled to a transducer side, wherein the backing is configured to attenuate acoustic signals received by the side of the transducer side. In one aspect, the backing includes a solid porous medium filled with a liquid between the grains of the solid media. The grains may be consolidated (for example fused to one another) or not fused to one another (unconsolidated). The unconsolidated grains, in one aspect, provide easy conformability to transducers with curved shapes. For substantially uniform grain sizes, the grain size may be selected to provide a selected permeability and corresponding loss factor. Alternatively, a distribution of grains sizes may be used to lower the porosity and to thereby adjust the acoustic impedance if that is desired for a better acoustic impedance match to the transducer. A distribution of grain sizes (poor sorting) also lowers the permeability. A filling fluid viscosity may be chosen to achieve a desired absorption. The backing thus includes solid grains with a liquid in the spaces between the grains. In one aspect, the backing is configured so that the acoustic impedance of the backing substantially matches the acoustic impedance of the transducer side. In another aspect, the apparatus includes a pressure-compensation device configured to provide pressure compensation to the transducer for use in a downhole or other high pressure environments. Any suitable pressure-compensation device may be utilized for the purpose of this disclosure. In one aspect, the pressure-compensation device includes bellows containing the liquid in communication with the backing. In another aspect, the pressure-compensation device includes a chamber containing a floating piston in a liquid that is in fluid communication with the backing. In another aspect, the backing may include a porous medium having a plurality of layers of solid grains, wherein at least two layers include different sizes of grain. The grains of different sizes may be selected so as to reduce acoustic reflection caused by a sudden change in acoustic attenuation at an interface between the transducer and the backing. The combination of the size of the grains and viscosity of the liquid is chosen so as to provide desired attenuation of the acoustic signals entering the backing. The grains may be made from any suitable material, including, but not limited to, bronze, steel, a solid polymer, a ceramic material, a combination of a metallic material and a non-metallic material, two or more metallic materials or two or more non-metallic materials. The backing may be configured as a container having packed grains therein. In aspect, the grains may be sintered.

In another aspect a method is provided, which method, in one embodiment, may include: providing an acoustic transducer; providing a backing that includes solid grains with a liquid in spaces between the solid grains; and placing the backing in contact with a surface of the transducer to attenuate acoustic signals received at the surface of the transducer. In another aspect, the method may further include substantially matching acoustic impedance of the backing to the acoustic impedance of the face of the transducer. In another aspect, the method may further include pressure balancing the transducer for a selected environment. In yet another aspect, the pressure balancing may be accomplished by providing bellows containing the liquid that is in fluid communication with the backing. In another aspect, the pressure balancing may be provided by attaching a chamber having the fluid therein and a floating piston that moves within the chamber as the volume of the fluid in the backing changes. In one configuration, the backing may include a plurality of layers of solid grains, wherein at least two such layers include different grain sizes. In aspects, the grains of different sizes may be selected so as to reduce acoustic reflection caused by a sudden change in acoustic attenuation at the surface the transducer. In yet another aspect, the sizes of the solid grains and the viscosity of the liquid to may be selected so as to provide a desired attenuation of the acoustic signals at the surface of the transducer. The solid grains may be chosen from a material that is one of: bronze; steel; solid polymer; ceramic material; a combination of two or more of a metallic material and a non metallic material. In one aspect, the backing may include a container having packed grains.

In yet another aspect, an acoustic tool for estimating a property of interest is provided, which tool, in one configuration, includes: a transmitter assembly that includes an acoustic transmitter and a backing in contact with a side of the acoustic transmitter, wherein the backing includes solid grains with a liquid in spaces between the solid grains. In one aspect, the transmitter may be configured to transmit acoustic signals into a formation surrounding a wellbore. The tool may include one or more receivers configured to receive signals from a formation responsive to the signals transmitted by the transmitter. A processor associated with tool may be configured to process signals received by the receiver to estimate a property of interest. The acoustic tool may be configured for acoustic logging of the wellbore after it has been drilled or for logging the wellbore during drilling of the wellbore.

The foregoing disclosure is directed to certain specific embodiments and method for ease of explanation. Various changes and modifications to such embodiments, however, will be apparent to those skilled in the art. All such changes and modifications are considered to be a part of this disclosure and within the scope of any appended claims.

The invention claimed is:

1. An acoustic apparatus, comprising:
an acoustic transducer having a front side and a back side;
a backing in contact with the back side of the transducer, the backing includes at least two layers of solid grains with a liquid in pores between the solid grains, the at least two layers of the backing including different grain sizes such that a layer next to the transducer has a greatest pore size, the backing being configured to attenuate acoustic signals that enter the backing from the back side of the transducer; and
a pressure balancing device configured to provide pressure balance to liquid in the backing, the pressure balancing device including a chamber containing a piston and the liquid in communication with the backing.

2. The apparatus of claim 1, wherein an acoustic impedance of the backing substantially matches an acoustic impedance of a surface of the transducer.

3. The apparatus of claim 1, wherein the different grain sizes are configured to reduce acoustic reflection caused by a sudden change in acoustic attenuation at an interface between the transducer and the backing.

4. The apparatus of claim 1, wherein size of the grains and viscosity of the liquid are chosen to provide a selected attenuation of the acoustic signals.

5. The apparatus of claim 1, wherein the grains are chosen from a group of materials consisting of: (i) bronze; (ii) steel; (iii) a solid polymer; (iv) a ceramic material; and (v) a combination of two or more metallic materials and a non-metallic material.

6. The apparatus of claim 1, wherein the solid grains are packed in a container.

7. The apparatus of claim 1, wherein the grains are sintered.

8. A method of providing an apparatus, comprising:
providing a tool body;
providing an acoustic transducer in the tool body;
providing a backing that includes solid grains with a liquid in pores between the solid grains;
placing the backing in contact with a back surface of the acoustic transducer to attenuate acoustic signals waves from the acoustic transducer at the back surface of the acoustic transducer, the backing including at least two layers of solid grains with a liquid in pores between the solid grains, at least two layers of the backing including different grain sizes such that a layer next to the transducer has a greatest pore size; and
pressure balancing the transducer using a pressure balancing device including a chamber containing the liquid and a piston, with the liquid in communication with the backing.

9. The method of claim 8 further comprising substantially matching acoustic impedance of the backing with acoustic impedance of the surface of the transducer.

10. The method of claim 8, wherein the solid grains of different sizes are configured to reduce acoustic reflection caused by a sudden change in acoustic attenuation at the surface of the transducer.

11. The method of claim 8, wherein providing the backing includes selecting size of the solid grains and viscosity of the liquid to provide a selected attenuation of acoustic signals at the surface of the transducer.

12. The method of claim 8, wherein the solid grains include a material chosen from a group consisting of: bronze; steel; a solid polymer; a ceramic material; a combination of two or more metallic materials and a non-metallic material.

13. The method of claim 8, wherein the solid grains are packed in a container.

14. The method of claim 8 further comprising placing the transducer and the backing in an acoustic tool for use in a wellbore for determining a property of interest.

15. An acoustic tool for determining a property of interest, comprising:

an acoustic transmitter having a backing in contact with a side of the acoustic transmitter at an interface, wherein the backing includes at least two layers of solid grains with a liquid in pores between the solid grains, the at least two layers of the backing including different grain sizes such that a layer next to the transducer has a greatest pore size, and wherein the acoustic transmitter is configured to transmit acoustic signals into a formation surrounding a wellbore and the backing is configured to attenuate signals from the transmitter at the interface;

a pressure balancing device configured to provide pressure balance to the liquid in the backing, the pressure balancing device including a chamber containing a piston and the liquid in communication with the backing;

a receiver configured to receive signals responsive to the signals transmitted by the transmitter; and a processor configured to process signals received by the receiver to estimate the property of interest.

16. The acoustic tool of claim 15, wherein the acoustic tool is configured for acoustic logging as one of: a tool for logging the wellbore after it has been drilled; and a tool for logging the wellbore during drilling of the wellbore.

17. A method of determining a property of interest, comprising:

transmitting acoustic signals into a formation from a transmitter deployed in a tool in a wellbore, wherein the transmitter includes a housing and backing in contact with the housing and wherein the backing includes at least two layers of solid grains with a liquid in pores between the solid grains, the at least two layers of the backing including different grain sizes such that a layer next to the transducer has a greatest pore size, the backing being configured to attenuate acoustic signals at an interface between the housing and the backing;

receiving acoustic waves by a receiver from the formation responsive to the transmitted acoustic waves;

providing pressure balance to liquid in the backing using a pressure balancing device in contact with the backing, the pressure balancing device including a chamber containing a piston and the liquid in communication with the backing; and processing signals from the receiver to estimate the property of interest.

\* \* \* \* \*